US012464963B2

(12) United States Patent
Mujkic

(10) Patent No.: US 12,464,963 B2
(45) Date of Patent: Nov. 11, 2025

(54) OBJECT DETECTION SYSTEM

(71) Applicant: AGCO International GmbH, Neuhausen (CH)

(72) Inventor: Esma Mujkic, Randers (DK)

(73) Assignee: AGCO International GmbH, Neuhausen (CH)

( * ) Notice: Subject to any disclaimer, the term of this patent is extended or adjusted under 35 U.S.C. 154(b) by 221 days.

(21) Appl. No.: 18/336,681

(22) Filed: Jun. 16, 2023

(65) Prior Publication Data
US 2023/0403965 A1 Dec. 21, 2023

(30) Foreign Application Priority Data

Jun. 17, 2022 (GB) .................................. 2208928

(51) Int. Cl.
*A01B 69/00* (2006.01)
*G06V 10/764* (2022.01)
*G06V 10/774* (2022.01)
*G06V 20/58* (2022.01)

(52) U.S. Cl.
CPC .......... *A01B 69/001* (2013.01); *G06V 10/764* (2022.01); *G06V 10/774* (2022.01); *G06V 20/58* (2022.01)

(58) Field of Classification Search
CPC .. A01B 69/001; G06V 10/764; G06V 10/774; G06V 20/58; G06V 10/809; G06V 10/82; G06V 20/64
See application file for complete search history.

(56) References Cited

U.S. PATENT DOCUMENTS

| | | | |
|---|---|---|---|
| 10,963,734 B1* | 3/2021 | Wang | G06T 7/74 |
| 2022/0026226 A1* | 1/2022 | Eichhorn | G05D 1/0274 |
| 2023/0252318 A1* | 8/2023 | Webb | G06V 20/52 |
| | | | 706/12 |

OTHER PUBLICATIONS

UK Intellectual Property Office, Search report for related UK Application No. GB2208926.2, dated Nov. 24, 2022, 3 pages.

* cited by examiner

*Primary Examiner* — Thomas Ingram

(57) ABSTRACT

An object detection system for an agricultural machine which utilises image data from one or more imaging sensors associated with the agricultural machine. The image data is analysed utilising first and second detection models to classify, for one or both models, an object within the environment of the agricultural machine. A classification metric for the object indicative of an overlap associated with the classification obtained for each of the models for the object is used in determining an identity for the object. One or more operable components associated with the agricultural machine may then be controlled in dependence on the determined identity.

17 Claims, 7 Drawing Sheets

OBJECT DETECTION SYSTEM

CROSS-REFERENCE TO RELATED APPLICATIONS

This application claims priority to United Kingdom patent application number GB 2208928.8, filed Jun. 17, 2022, the entirety of which is hereby incorporated by reference.

FIELD

Embodiments of the present disclosure relate generally to a control system and method for an object detection system, and in particular an object detection system for an agricultural machine.

BACKGROUND

It is advantageous to be able to detect objects within an agricultural working environment. This can include detection of static or dynamic objects, which may provide an obstacle to the motion of a machine operating in the environment, or can include other machines working in the environment. To date, operator assistance systems have been provided which may detect and alert an operator of a machine to the presence of objects within the environment. In extensions of such systems, this could be incorporated into into machines with autonomous capabilities, where preemptive action may be taken automatically on the detection of one or more obstacles, or for controlling motion of the machine with respect to other detected machines within the environment, for example.

Some known systems may utilise object detection algorithms. It will be appreciated that such systems require intensive training prior to being released to be able to detect and classify a pre-defined set of obstacles, and can require a significant number of image examples from each class of objects. Therefore such training is usually limited to the most common classes of objects that may be encountered in the working environment of the agricultural machine (e.g. other machines, humans, implements, poles, bales, etc.).

However, agricultural machines are not only used in agricultural environments, and are regularly used on-road, e.g. during a transport operation or when moving between fields, farms etc. It is also possible that non-agricultural equipment may be present within a working environment, for example cars may be parked at field boundaries, trucks may be used in the unloading of grain from harvesters, etc. By not accounting for all possible working scenarios, such object detection algorithms may potentially result in obstacles and other objects not being identified or being misclassified. For operator assistance systems this may increase the workload for the operator and lead to a lower trust by the operator in the effectiveness of the system.

One solution may be to train the object detection algorithms on a wider dataset to include all possible working scenarios for an agricultural machine. However, in doing so the level of training required may become unworkable, and could reduce the effectiveness of a particular trained model in positively identifying certain objects.

It would be advantageous to provide a system (and associated method) which overcomes or at least partly mitigates one or more problems associated with the prior art systems.

BRIEF SUMMARY

In an aspect of the invention there is provided a control system for an object detection system for an agricultural machine, the control system comprising one or more controllers, and being configured to: receive image data from one or more imaging sensors associated with the agricultural machine; analyse the image data utilising first and second detection models to classify, for one or both models, an object within the environment of the agricultural machine; determine a classification metric for the object indicative of an overlap associated with the classification obtained for each of the models for the object; and determine an identity for the object in dependence on the classification metric and the classification obtained for the first and/or second models; wherein the control system is configured to control operation of one or more operable components associated with the agricultural machine in dependence on the determined identity.

Advantageously, the present invention utilises a pair of detection models to improve identification of objects within the environment of the agricultural machine. This can provide added redundancy to the object detection system, in turn improving the positive identification rate. Prioritising the first model over the second model in dependence on an overlap—e.g. where outputs from the models relate to the same object—can additionally provide contextual awareness for the system. As described herein, the first model may be trained on a dataset which relates at least in part to an agricultural context and as such it may be desirable to prioritise the output of this model for an object detection system for an agricultural machine, in manner of the present invention.

The one or more controllers may collectively comprise an input (e.g. an electronic input) for receiving one or more input signals. The one or more input signals may comprise image data from the one or more imaging sensors. The one or more controllers may collectively comprise one or more processors (e.g. electronic processors) operable to execute computer readable instructions for controlling operational of the control system, for example, to analyse the image data and/or to determine the classification metric. The one or more processors may be operable to generate one or more control signals for controlling operation of the one or more operable components. The one or more controllers may collectively comprise an output (e.g. an electronic output) for outputting the one or more control signals.

The first and/or second detection models may comprise machine-learned models. The machine-learned models may be trained on one or more training datasets with known objects with respective classifications. The machine-learned model(s) may comprise a deep learning model utilising an object detection algorithm. The deep learning model may include a YOLO detection algorithm, such as a YOLOv5 detection model, for example.

Whilst discussed herein with reference to first and second detection models, it will be appreciated that the present disclosure may extend to the use of more than two models, and may involve determination for a classification metric associated with an overlap between two or more of the detection models.

The training datasets for first and second models may be different. For example, the training dataset for the first model may comprise an "off-road" dataset, and the training dataset for the second model may comprise an "on-road" dataset. The training dataset for the first model may comprise an agricultural dataset, comprising training images including agricultural-specific objects. The training dataset for the second model may comprise a generic dataset, which may for example, include training images including generic objects, including on-road and the like. The generic dataset may, for example, comprise the widely available Microsoft Common Objects in COntext dataset (MS COCO), although other datasets may be used, including datasets assembled specifically for training the second model. Advantageously, utilising two models trained on different datasets may advantageously provide an object detection system operable in multiple working environments, This makes it particularly beneficial for agricultural machines which may operate across multiple environments, including both off-road (e.g. working in a field) and on-road during transport tasks or when moving between working environments, for example. Using two different models and two different datasets prevents dilution of a single model trained on datasets across multiple working contexts providing a better positive identification rate for each model individually. As discussed herein, the present invention relates to combining the outputs of the two models.

Classification by the first and/or second detection models may comprise assignment of a class to the object. The class may be one of a plurality of classes for the respective model, as determined during the learning process through assignment of suitable labels to known objects. The plurality of classes may be grouped by category, and optionally by subcategory. For example, the plurality of classes may include 'tractor', 'combine', 'car', 'truck', 'trailer', 'baler', 'combine header', 'square bale', 'round bale', 'person', and 'animal', for example. The classes may be grouped into categories, which may include, for example, 'Vehicle', 'Implement', 'Static Object', and 'Dynamic Object'. The 'Vehicle' category may be further divided into sub-categories, including 'Agricultural'—for example including classes 'tractor' and 'combine'—and 'Road'—including classes 'car', and 'truck', for example. The 'Implement' category may be further divided into sub-categories, including "Tractor'—for example including classes 'trailer' and 'baler'—and 'Combine'—including the 'combine header' class, for example. The 'Static Object' category may include a sub-category 'Bale', for example including classes 'round bale' and 'square bale'. The 'Dynamic Object' category may include a sub-category 'Person', for example including the 'person' class.

The control system may be configured to determine the identity for the object in dependence on the class, sub-category and/or category of the classification for the first and/or second model. For example, where the first and second models output a classification in the same category or subcategory, priority may be assigned to the first model. This may be of particular use where the first model outputs a class of 'tractor' and the second model outputs a class of 'truck'. Assigning priority to the first model may provide a final identity for the object as 'tractor' which has a higher probability of being the correct identity given the operational context of the agricultural machine. As discussed herein, this is also determined in dependence on the classification metric.

The classification output by the first and second models may comprise a bounding box overlaid onto the image data at the location of the object as determined by the respective model. In embodiments, the classification metric may comprise a measure of an overlap of the bounding boxes determined for the first and second models. The measure of overlap may comprise a calculation of an Intersection over Union, or 'IOU', associated with the bounding boxes output from the first and second models.

Where the models have classified a common object it is envisaged that the bounding boxes will overlap. For distinct objects there should be minimal or no overlap. Accordingly, the control system may be configured to utilise the overlap to determine whether the outputs of the models relate to a common object or to distinct objects.

The control system may therefore be configured to compare the classification metric with a threshold value. In this way, thresholding can be used to identify where the models have classified a common object. In embodiments, the control system may be configured to discount the classification from the second model in dependence on the classification metric exceeding the threshold. In other words, the control system may be configured to determine the identity for the object in dependence on the classification for the first model only in dependence on the classification metric exceeding the threshold.

The threshold may be predetermined. The threshold may be variable, and may be dependent on a context parameter. For example, the threshold may be set at a comparatively lower value where it is known that the agricultural machine is operating in an agricultural environment. Accordingly, by lowering the threshold the priority assigned to the first model is effectively increased by discounting more classifications determined by the second model. In some embodiments the threshold may be set at a comparatively higher value where it is known that the agricultural machine is operating in a non-agricultural environment, such as on a road, where non-agricultural objects may be encountered more often. In effect, raising the threshold assigns more weight to the second model thereby utilising the classifications determined for the second model more often.

In some embodiments, the threshold may be dependent on the classification assigned by the first model. For example, it may be known (e.g. through calibration, experimentation etc.) that the second model misclassifies a certain object type more often than others. Accordingly, the threshold may be set at a comparatively lower value where the first model classifies the object in a class or classes corresponding to that object type. In embodiments, the threshold may be set at a comparatively lower value where the output from the first model includes classification of an agricultural vehicle and a corresponding implement—e.g. two classifications (and optionally associated bounding boxes) adjacent and possibly overlapping one another. This may in turn effectively reduce the weight assigned to the output of the second model, which may for example misclassify the vehicle-implement combination as a 'truck'. In embodiments, the threshold may be set at a comparatively higher value where the output from the first model includes classification of a separate vehicle or implement—e.g. a single classification. This may in turn effectively increase the weight assigned to the output of the second model where there is a lower probability of the second model misclassifying the object.

A 'lower' value for the classification metric threshold may comprise an IOU value of between 0.5 and 0.8, inclusive, for example. In embodiments, the lower threshold may be set at an IOU value of 0.6, and the control system may be configured to discount the output from the second model in dependence on the classification metric corresponding to an IOU value equal to or exceeding an IOU value of 0.6. A 'higher' value for the classification metric threshold may comprise an IOU value of between 0.7 and 1.0, inclusive, for example. In embodiments, the higher threshold may be set at an IOU value of 0.8, and the control system may be configured to discount the output from the second model in dependence eon the classification metric corresponding to an IOU value equal to or exceeding an IOU value of 0.8.

The one or more imaging sensors may include a camera. The one or more imaging sensors may comprise a LIDAR sensor. Where used, a LIDAR sensor may be used to obtain information relating to the distance between the object and the sensor, and as such can be used in conjunction with the image data from another sensor, e.g. a camera, for classification by the first and/or second models, for example, for analysing the expected size of a given object within the camera data using the depth information from the LIDAR sensor.

In embodiments, the one or more operable components may include a user interface. The user interface may comprise a display terminal of the machine, for example, a display terminal provided within an operator cab of the agricultural machine, or a remote user device, which may be operable in combination with the agricultural machine.

The control system may be operable to output, e.g. via the user interface, an indicator indicative of the determined identity to an operator of the agricultural machine. This may provide increased situational awareness to the operator of the working environment.

The one or more operable components may include a guidance system for the agricultural machine, which may include a steering and/or propulsion system of the machine. Advantageously, the control system may be configured to control operation of the guidance system for controlling operation thereof for controlling motion of the machine in dependence on the determined identity for the object. This may include reducing a speed of the machine, including bringing the machine to a stop where an object is detected and identified in the path of the machine. This may include controlling a speed and or steering of the machine for controlling movement of the machine along an operational path which is dependent on the identity of the object. For instance, in embodiments the control system may be configured to control an operational speed and/or path for the machine in order to follow an identified vehicle ahead of the machine for performing a fully or at least semi-autonomous operation. In an example, the machine may comprise a tractor with a trailer and the control system may be configured to identify a further agricultural machine within the environment, e.g. a combine harvester performing a harvesting operation. The control system may be configured to control movement of the tractor along an operational path to align the trailer with an unloading mechanism of the combine for receiving crop material from the combine in the trailer of the tractor-trailer combination. The present invention is advantageously used here for positively identifying the combine.

The one or more operable components may comprise a data server associated with the agricultural machine. This may comprise a local server or a remote server, for example, accessible via a wireless data communication channel such as a data network, cellular network or the like. The control system may be operable to store on the data server information indicative of the determined identity for the object. This may be advantageous, for example, where the present invention is utilised to detect and track the positions of multiple agricultural machines within a working environment. The control system can store this information on the data server which in turn may allow, e.g. a remote operator, to remotely track a farming operation in the working environment utilising multiple vehicles. Using an image based system on a machine with an appropriate data communication capability may allow for tracking of multiple machines and implements within an environment without such systems, or without onboard positioning systems such as a GNSS system, which may be the case for example for individual implements.

A further aspect of the invention comprises an object detection system for an agricultural machine, comprising one or more imaging sensors; wherein the system further comprises and/or is controllable by the control system of any preceding aspect.

Another aspect of the invention provides an agricultural machine comprising a control system and/or an object detection system as described herein.

The agricultural machine may comprise a harvesting machine, such as a combine harvester or forage harvester, for example. The agricultural machine may comprise a tractor.

A further aspect of the invention provides a method of object detection, comprising: receiving image data from one or more imaging sensors associated with an agricultural machine; analysing the image data utilising first and second detection models to classify, for one or both models, an object within the environment of the agricultural machine; determining a classification metric for the object indicative of an overlap associated with the classification obtained for each of the models for the object; determining an identity for the object in dependence on the classification metric and the classification obtained for the first and/or second models; and controlling operation of one or more operable components associated with the agricultural machine in dependence on the determined identity.

The method of the present aspect of the invention may comprise performance of any one or more of the functional features of the control system of a preceding aspect discussed herein.

A further aspect of the invention comprises computer software which, when executed by one or more processors, causes performance of the method of the preceding aspect of the invention.

An aspect of the invention provides a computer readable storage medium comprising the computer software of the preceding aspect of the invention.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the disclosure will now be described, by way of example only, with reference to the accompanying drawings, in which.

DETAILED DESCRIPTION

Figure 1:
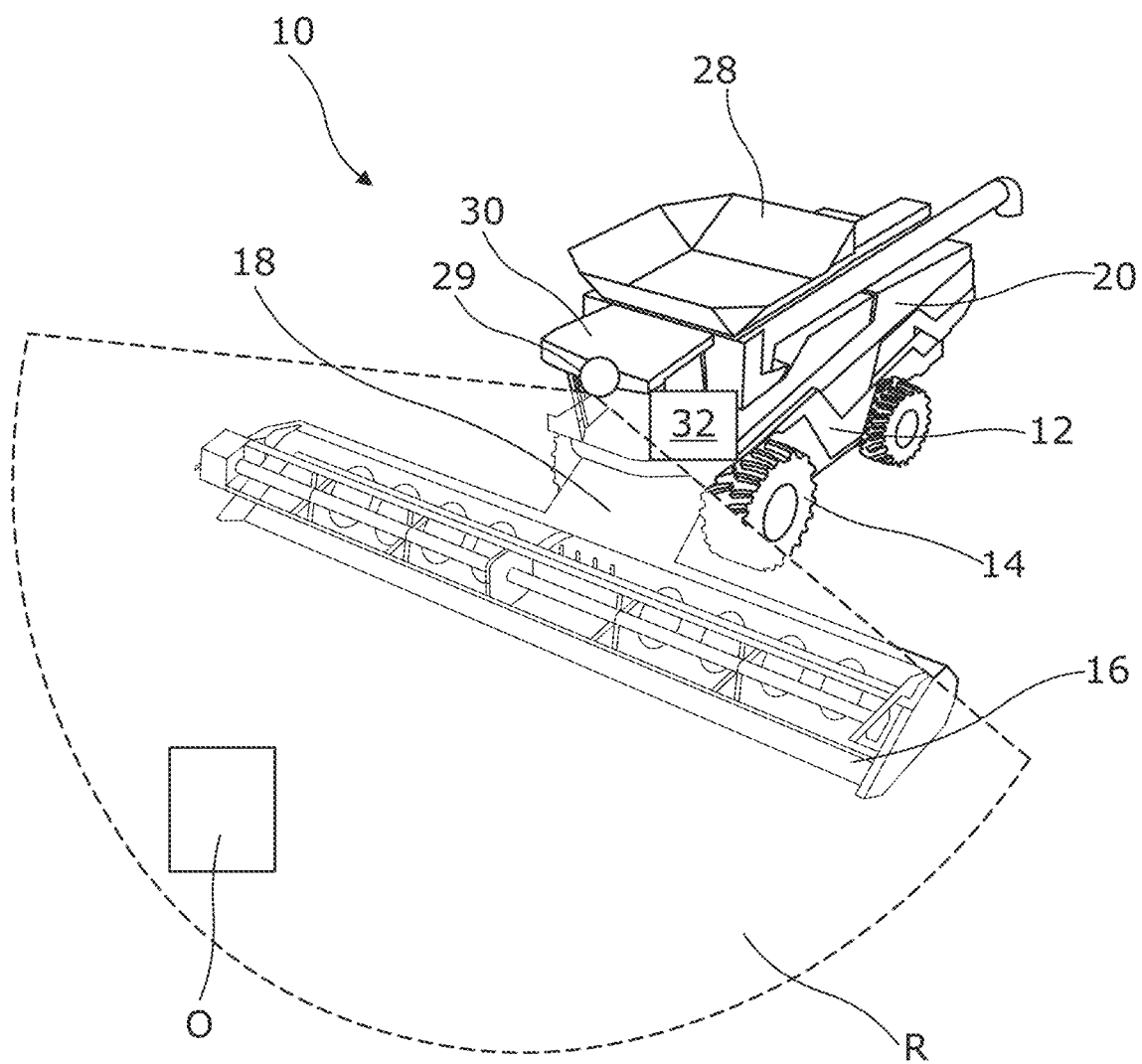
FIG. 1 is a simplified perspective view illustrating an embodiment of an agricultural machine according to the present disclosure.

Systems and methods are provided for controlling operation of an object detection system for an agricultural machine (e.g. a harvester 10). Image data from one or more imaging sensors (e.g. cameras 29, LIDAR units, etc.) mounted, coupled or otherwise associated with the harvester 10 is obtained and used to detect objects (e.g. object 'O') within the environment of the harvester. Specifically, the image data is analysed utilising first and second detection models to classify, for one or both models, object(s) within the environment. This classification is analysed to determine a classification metric for the object which indicative of an overlap associated with the classification obtained for each of the models for the object O. An identity for the object O is determined in dependence on the classification metric along with the classification obtained for the first and/or second models. Operation of one or more operable components associated with the harvester 10 can then be controlled in dependence on the determined identity. As discussed herein, the operable component(s) may include functional components of the harvester 10, including a guidance system of the harvester 10, for example, for controlling motion of the harvester 10, e.g. through control over a propulsion, braking and/or steering system of the harvester 10. Additional operable components may include a user interface, e.g. display terminal 32 provided within an operator cab 30 of the harvester 10 for displaying information indicative of the determined identity to an operator of the harvester 10.

Harvester

FIG. 1 illustrates an agricultural harvester 10, which includes a chassis 12 supported and propelled along the ground by ground-engaging wheels 14. Although the harvester 10 is illustrated as being supported and propelled on ground-engaging wheels 14, the harvester 10 can also be supported and propelled by full tracks or half tracks, as will be appreciated. A harvesting header 16 carried by the chassis 12 is used to gather crop and to conduct the crop material to a feederhouse 18 and then to a beater in the harvester 10. The beater guides the crop upward to a threshing and separating system 20, which is configured to separate grain from material other than grain (MOG), and deliver the grain to a grain tank 28 carried by the harvester 10. The operation of the harvester 10 is controlled from an operator cab 30. A user interface 32 is provided within the operator cab 30 for displaying or otherwise providing information to an operator of the harvester 10 data indicative of the operation of the harvester 10 or other associated components, e.g. the header 16 or the object detection system as discussed herein.

The harvester 10 is additionally provided with an imaging sensor in the form of camera 29 mounted thereto and configured to obtain image data representative of the working environment of the harvester 10, and analysed in the manner discussed herein. In an extension of the present disclosure, the harvester 10 (or more generally the agricultural machine) may additionally or alternatively be provided with a different type of imaging sensor. For example, a transceiver-type sensor, such as a LIDAR sensor may be provided for imaging the environment of the machine. Advantageously, transceiver-type sensors may provide depth information for the environment, including a measure of a distance between the machine and the object. This can be utilised by the present disclosure, and in particular by the detection models for classifying objects within the environment of the machine.

Whilst discussed herein with reference to harvester 10, it will be apparent to the skilled reader that the systems and methods discussed herein may be applicable to any agricultural machine, including forage harvesters, self-propelled balers, tractors and tractor/implement combinations, including others.

Control System

As discussed herein, a control system 100 is provided and configured to control operation of one or more operable components (e.g. a guidance system 120, data server 130, and/or user interface 32) associated with the harvester 10. In the illustrated embodiment the controllable components include a guidance system 120 of the harvester for controlling operational parameters of the harvester 10, e.g. a forward speed or path, a data server 130 for storing information representative of the classification outputs of the first and/or second detection models; and the user interface 32, here provided as a display terminal 32 provided within the operator cab 30 of the harvester 10 as discussed, and utilised to provide an indication of the operation of the control system 100, e.g. a determined identity for an object within the working environment of the harvester 10.

Figure 2:
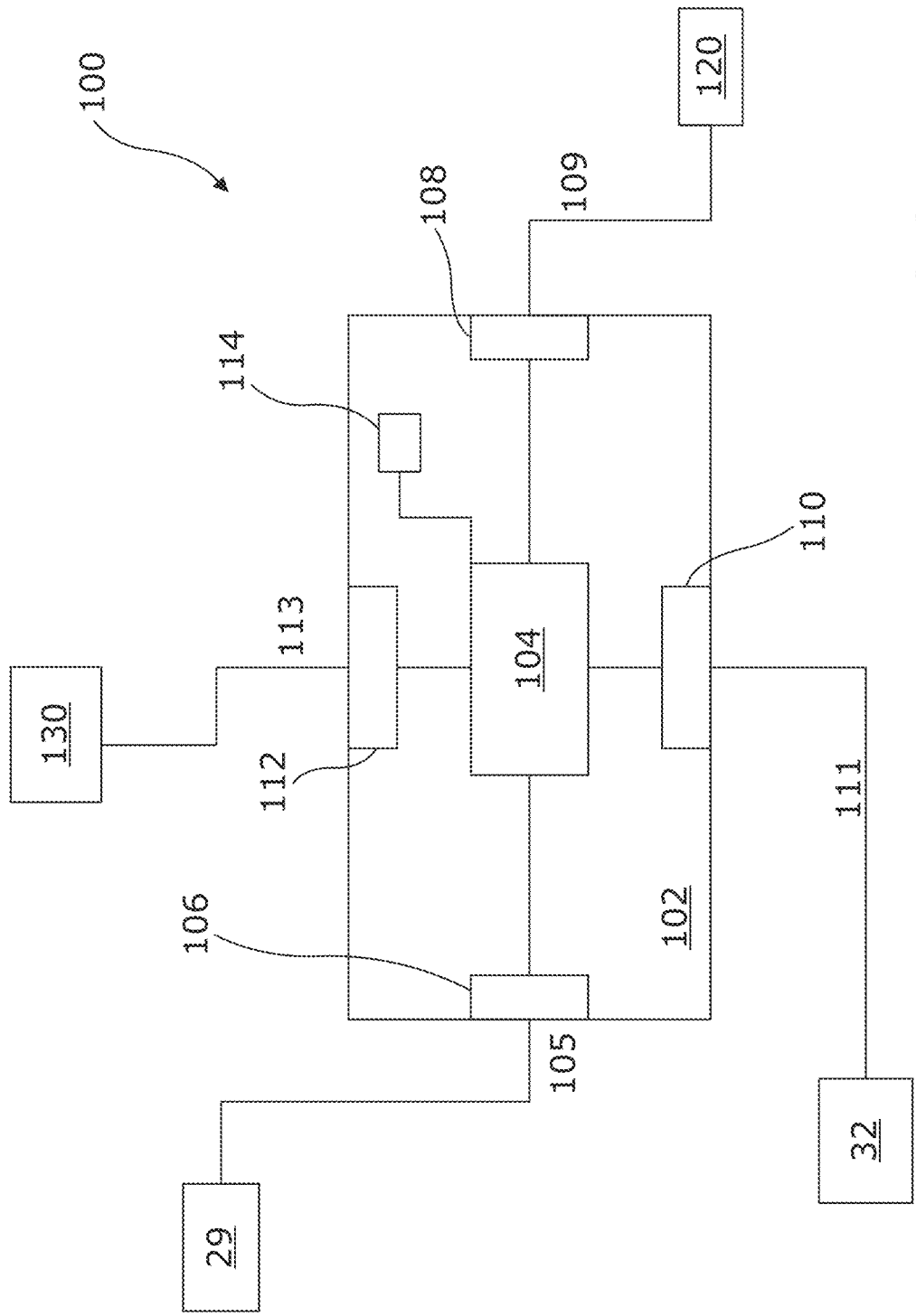
FIG. 2 is a schematic diagram illustrating an embodiment of a control system of the present disclosure.

FIG. 2 illustrates the control system 100 further. As shown, control system 100 comprises a controller 102 having an electronic processor 104, electronic input 106 electronic outputs 108, 112 and electronic input/output 110. The processor 104 is operable to access a memory 114 of the controller 102 and execute instructions stored therein to perform the steps and functionality of the present disclosure discussed herein, e.g. by controlling operation of operable components associated with the harvester 10 in dependence on a determined identity for one or more objects in the environment of the harvester 10, as determined by the control system 100, optionally including controlling the user interface 32 to display information indicative of determined identities and/or to receive an operator input for initiating control actions based on the determined identities, through generation and output of one or more control signals.

The processor 104 is operable to receive via input 106 which, in the illustrated embodiment, takes the form of input signals 105 received from a control unit associated with camera 29 associated with the harvester 10, image data representative of the working environment of the harvester 10. The processor 104 is configured to analyse the image data and determine therefrom a classification for one or more objects in the environment in the manner discussed herein, i.e. using first and second trained object detection models for identifying the objects. The processor 104 is further configured to utilise the determined classifications to determine a classification metric for the or each object. Here, the classification metric is a measure of an overlap associated with the classification obtained for each of the models for the object, and effectively quantifies a likelihood of the models classifying a common object, as discussed herein.

As described above, the controller 102 includes an electronic output 108 configured to output control signals 109 generated by the processor 104 for controlling operation of one or more operable components associated with the harvester 10. Specifically, in the illustrated embodiment, the processor 104 is operable to generate, and the controller 102 operable then to output via output 108, control signals 109 to local control unit of a guidance system 120 of the harvester 10 for controlling motion of the harvester 10 in dependence on the identity of the objects as determined in the manner described herein. In practice, this may include control over a forward speed and/or operational path for the harvester 10. For certain objects such as obstacles, animals, humans, etc. this may include slowing the forward speed of the harvester 10, upto and including bringing the harvester 10 to a stop to reduce the likelihood of a collision. For other objects, such as other working machines in the environment, the guidance system may be utilised to control movement of the agricultural machine for performing a cooperative task. The guidance system 120 may be operable to control operation of one or more of a steering system, braking system and/or propulsion system of the harvester 10, for example, for controlling motion of the harvester 10 in the manner described herein.

Input/output 110 is operably connected to user interface 32. The control system 100 is operable to control operation of the user interface 32, e.g. through output of control signals 111 in order to display data to an operator of the harvester 10 indicative of the identity of the object(s), as determined by processor 104. This can include simply providing an indication to the operator of the determined identity(ies). This may include providing a graphical representation, optionally including image data from the camera 29, of the working environment, object(s) located therein and any identities determined for those objects as per the present disclosure. The input/output 110 is additionally configured to receive input signals 111 from the user interface 32 indicative of an operator input at the user interface 32, for example to provide the operator an ability to interact with the data.

Output 112 is operably connected to a data server, preferably a remote data server 130 for storing information indicative of the determined identities. This may be used, for example, by a remote user monitoring operation of multiple machines within the working environment. Here, the image data from the camera 29 can therefore be used to provide tracking data for multiple machines to a remote server 130.

Method

Figure 3:
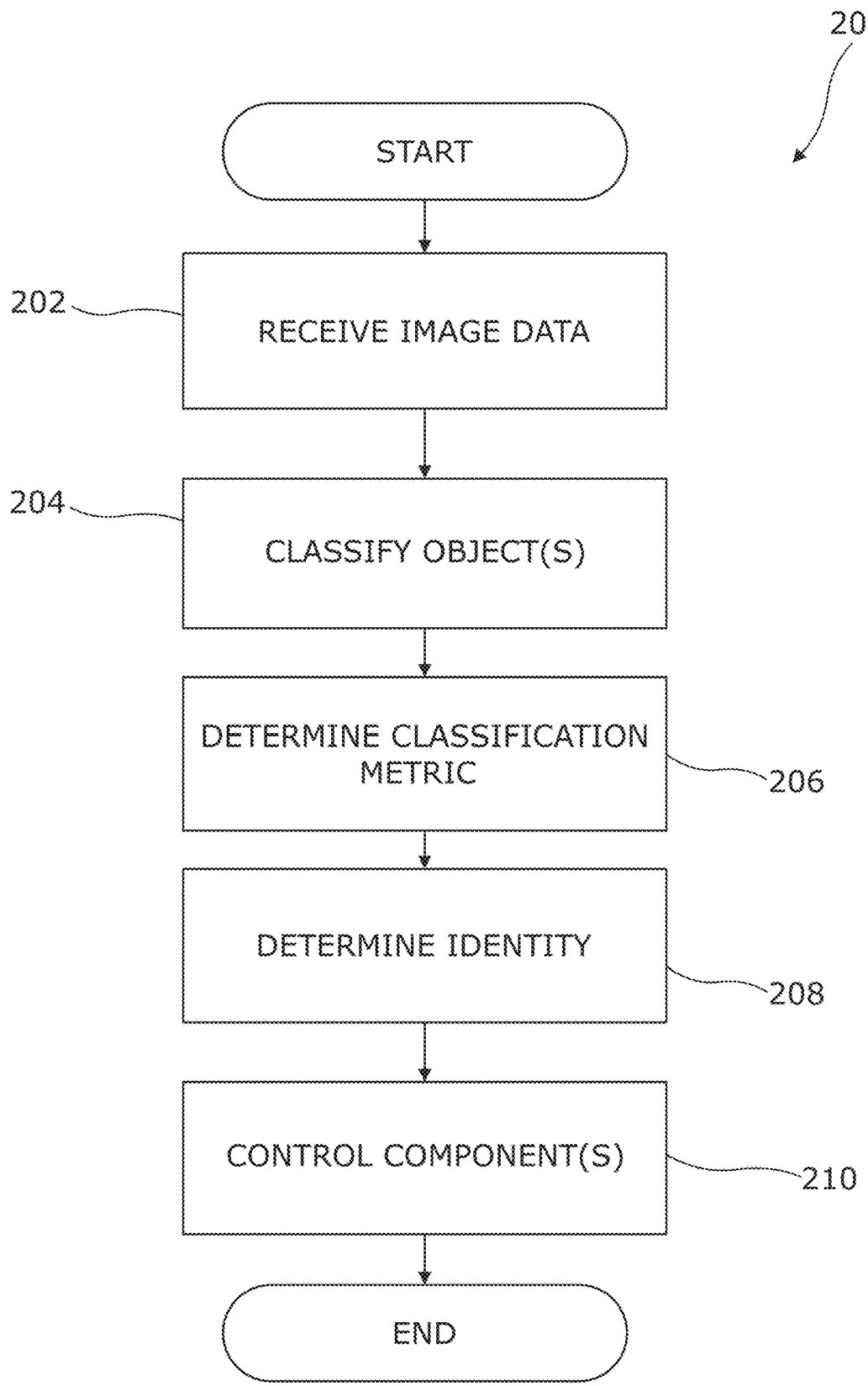
FIG. 3 is a flowchart illustrating an embodiment of a method of the present disclosure.

FIG. 3 illustrates a method 200 in accordance with the present disclosure. Method 200 comprises, at step 202, receiving image data from one or more image sensors (here camera 29) mounted to the harvester 10 and operable, in use, to capture image data representative of the working environment of the harvester 10. As shown herein, the camera 29 is mounted on the operator cab 30 of the harvester 10 and is directed such that the field of view R of the camera 29 encompasses a region ahead of the harvester 10, in use. It will be appreciated that the invention is not limited in this sense, and the camera 29 or indeed any imaging sensor employed may be mounted with a field of view about any direction of the working machine.

At step 204, the image data received, here from camera 29, is analysed utilising first and second detection models to classify, for one or both models, an object within the environment of the harvester 10. Each of the first and second detection models comprise trained object detection algorithms, trained using respective training datasets having a plurality of images and known objects in those images. In an embodiment, the first model is trained on an agriculture-specific dataset, and the second model is trained on a generic dataset, e.g. as discussed in detail hereinbelow.

At step 206, a classification metric for the object is determined. Here, the classification metric quantifies an overlap associated with the classification obtained for each of the models for the object. Specifically, the classification output by the first and second models can include a bounding box overlaid onto the image data at the location of the object as determined by the respective model. Here, the classification metric then comprises a measure of an overlap of the bounding boxes determined for the first and second models. In a preferred embodiment, the measure of overlap includes a calculation of an Intersection over Union, or 'IOU', associated with the bounding boxes output from the first and second models. The bounding boxes for a common object are likely to overlap. For distinct objects there should be minimal or no overlap. Accordingly, the control system 100 and method 200 utilises this overlap to determine whether the outputs of the models relate to a common object or to distinct objects and acts accordingly. A threshold is defined for the classification metric for the purpose of differentiating between common and distinct objects, e.g. in the manner described in detail below. This may be pre-defined, or may be variable. In some instances it may depend on the classification output from the first and/or second detection models.

At step 208, an identity for the object is determined in dependence on the classification metric and the classification obtained for the first and/or second models. Where both the first and second detection models have classified a common object, a decision is taken as to which classification represents the likely identity of the object, and this is done using the classification metric. For example, for a high level of overlap, priority may be assigned to the first or second model as appropriate. When operating in an agricultural context, a higher weight may be applied to the output of a model trained on agriculture-specific training data, For other use cases, e.g. on-road use, the model trained on generic dataset may be more applicable. Where only one of the models has classified a particular object, the classification metric will be zero, and the identity is determined as has been classified by the detection model which has classified the object.

At step 210, the operable component(s) associated with the machine are then controlled based on the identity. In an example, a forward speed for the harvester 10 may be adjusted e.g. reduced, in dependence on an identification of an object or more specifically an obstacle ahead of the harvester 10. In practice, adjusting a forward speed of the harvester 10 includes control over a braking and/or propulsion system of the harvester 10, e.g. via guidance system 120. This may extend to controlling a steering system of the harvester 10, e.g. for controlling the harvester 10 to operate along an operational path, e.g. to avoid the location of an identified object. In some instances this may extend to controlling movement of the harvester 10 with respect to other identified machines in the environment.

Additionally or alternatively, this may include output of information relating to the determined identity(ies) to the remote data server 130, serving as a tracking system for tracking the position of objects, including other agricultural machines, within the working environment.

Further, operable component(s) can, in embodiments, include control over the user interface 32 in the manner discussed herein. For example, controlling the user interface 32 to display or otherwise present to the operator an indication of determined identity(ies), and/or a representation of image data obtained by the camera 29 or other applicable imaging sensors.

Figure 4A:
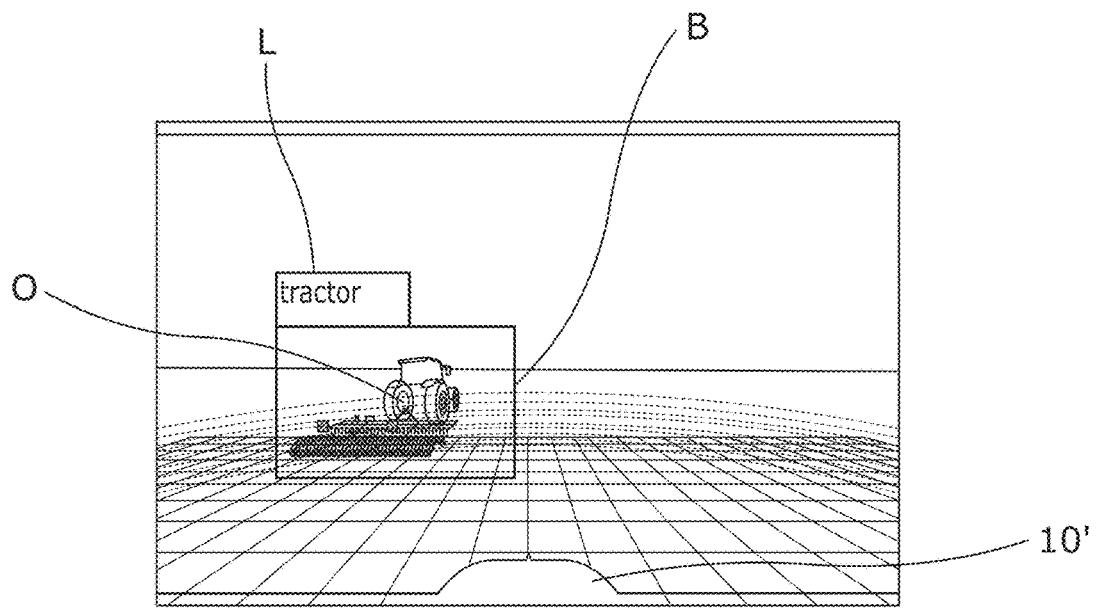
FIGS. 4A & 4B are illustrative examples of image data obtained demonstrating the operational use of embodiments of the present disclosure.
Figure 4B:
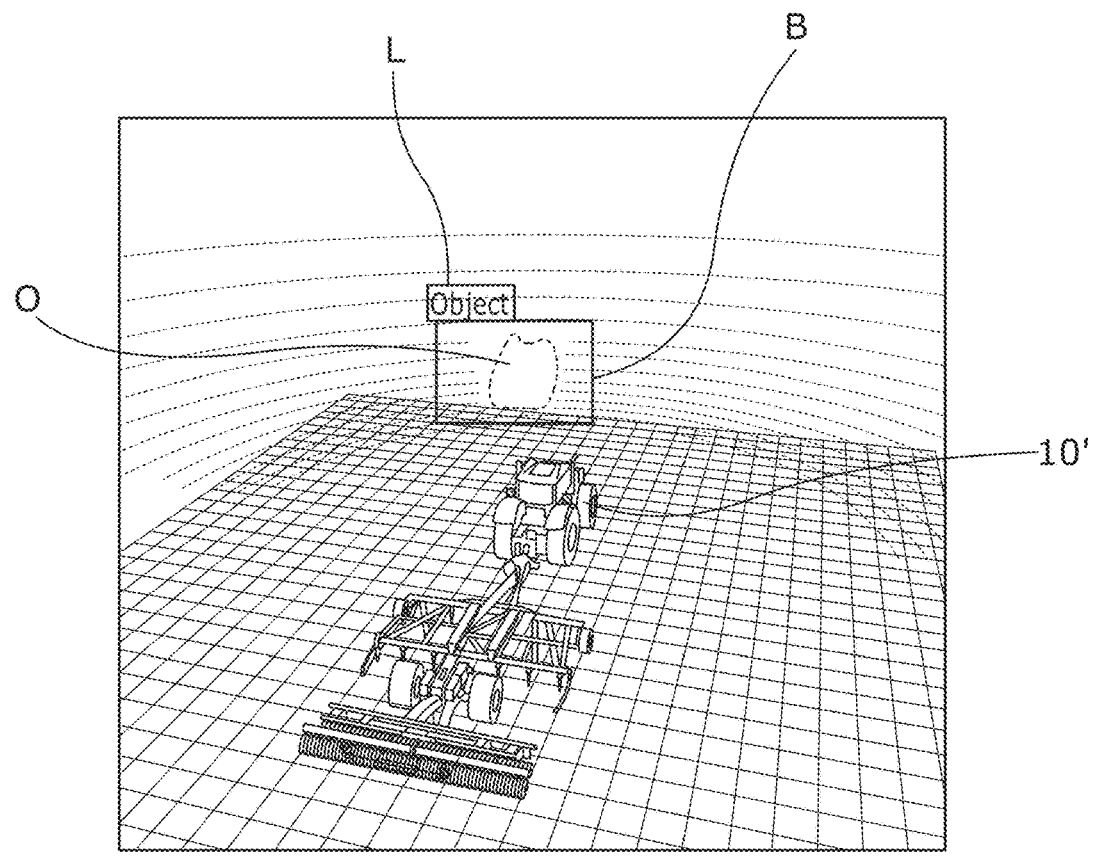

FIGS. 4A and 4B illustrate example representations that may be provided by the user interface 32 upon successful identification of a given object. For example, FIG. 4A represents a representation of image data obtained by a camera 29' provided on an agricultural machine in the form of a tractor 10'. Here an object 'O' has been identified in the manner discussed herein, and an appropriate bounding box B and label L has been provided to highlight the position and identity of the object—here another tractor—to an operator of the tractor 10'. FIG. 4B represents a representation of image data obtained by a LIDAR unit also provided on the tractor 10'. Again, the object 'O' is identified and highlighted in the image data from the sensor—LIDAR unit. The LIDAR unit may be used to provide depth information which is used in conjunction with the image data from camera 29' for identifying the object O.

Further discussion of the experimental setup for proving the operational benefit of the present disclosure is discussed below, and with reference to FIGS. 5-6B. This additionally provides further detail on the combination of classification output from the first and second detection models and the advantages realised by the present disclosure.

Experimental Setup

1. Introduction

This present disclosure is focused on object detection for agricultural machines operating during summer harvest, although it will be appreciated that the disclosure is applicable to other agricultural scenarios.

The present disclosure utilises the benefits of pre-trained models for general classes of objects (the second detection model) and a model trained on a smaller agriculture specific dataset (the first detection model) by proposing an ensemble module that combines their predictions. The second detection model is trained on MS COCO dataset and three classes 'person', 'car' and 'truck' are selected as relevant for this scenario. The model for detection of agriculture specific classes is trained to detect 7 classes: 'tractor', 'combine', 'trailer', 'combine header', 'baler', 'square bale', and 'round bale'. Both models have YOLOv5 architectures. The performance of models is evaluated on a test set that contains 10 classes of objects that the two models are able to detect together. The evaluation of this approach is discussed below.

Since multiple classes from both models refer to different types of vehicles, a single vehicle object may be detected by both models and assigned different classes. To addresses this challenge the present disclosure introduces an ensemble step (determining the identity of the object based on the classification metric) that removes redundant detections. Ensemble methods that combine the output of detection models by eliminating redundant bounding boxes, and the present disclosure utilises an ensemble module based on hierarchical information of class structure within test dataset. It has been shown that applying the proposed ensemble module improves mean average precision (mAP) on the test set. Moreover, it is also shown that translating the model predictions to a higher level in the hierarchical structure of classes improves mAP even further at the cost of class granularity.

2. Methods 2.1. Datasets 2.1.1 Common Objects in Context (COCO)

The second detection model utilises an object detection algorithm trained on an Microsoft COCO (MS COCO) dataset. The dataset contains 123 k training and validation images annotated for 80 categories of objects. The images are taken from everyday scenes containing common objects. Annotated classes of objects are grouped into 12 supercategories. Amongst the supercategories and classes, those relevant to an agricultural context are selected. Specifically, in the case of object recognition for agricultural vehicles, supercategories persons, vehicles and animals are of interest. For this paper, the classes 'person', 'car' and 'truck' are selected. During field operation, it is very common that farmers and workers are present in the field and especially around the vehicles during servicing. Vehicles such as cars are often left parked at the boundaries of the field. Trucks are often used for unloading of harvested grain.

2.1.2 Agricultural Dataset for Object Detection

The dataset used for training of the first detection model (the agriculture specific dataset) consists of 14318 images annotated for 7 agriculture specific classes. The annotated classes are: 'tractor', 'combine', 'trailer', 'combine header', 'baler', 'square bale', and 'round bale'.

2.2 Testing Dataset

For testing of the first and second detection models, dataset annotated for box-based object detection is used. The dataset consists of 7.9 k images collected by two agricultural vehicles during 13 days. The annotated classes are: 'tractor', 'combine', 'trailer', 'combine header', 'baler', 'square bale', 'round bale', 'person', 'car' and 'truck'. Adopting the hierarchical approach, the base classes are grouped into categories at two levels of granularity. The first level, 'subcategory' represents coarse labels for the base classes. At the top level, labelled 'supercategory', the subcategories are grouped even further to very general categories such as 'Vehicle', 'Implement', 'Static object' and 'Dynamic object'. This is shown in Table 1, below.

TABLE 1

Overview of Classes in the Test Dataset

| Supercategory | Sub-Category | Class |
| --- | --- | --- |
| Vehicle | Agricultural | Tractor |
|  |  | Combine |
|  | Road | Car |
|  |  | Truck |
| Implement | Tractor | Trailer |
|  |  | Baler |
|  | Combine | Combine Header |
| Static Object | Bale | Square Bale |
|  |  | Round Bale |
| Dynamic Object | Person | Person |

2.3 Object Detection Models

As discussed, two object detection models are used, here based on YOLOv5. The first model is trained to detect 7 agriculture specific classes using transfer learning. The second model is a trained on a COCO dataset of the type discussed above.

The YOLOv5 models are a single-stage object detectors and consist of a backbone network, neck and detection head. The cross stage partial connections (CSP) backbone network is used to extract features from the input image. The layers in the neck of the network are inserted to collect feature maps from different stages. This enables the model to perform better when detecting objects of various sizes and scales. In YOLOv5, PANet is used as the neck network to obtain feature pyramids. The YOLO head applies anchor boxes on features and generates final output vectors with class probabilities, objectness scores and bounding boxes.

The model for detection of agricultural classes is YOLOv5s model trained on the agricultural dataset as discussed above. The dataset has been randomly split to training dataset and validation with 70:30 ratio. The images are resized to 640×640 and the model is trained for 300 epochs using default hyperparameters.

The model used for detection of classes 'person', 'car' and 'truck' is YOLOv51 model trained on COCO dataset to detect 80 classes of common objects. During non-max suppression stage the three classes are selected from the predictions.

2.4 Ensemble Module

Since the two models are trained for the classes that belong to the same supercategories, it is expected that the same objects will be detected by both models. However, since the base classes that the models detect are distinct the models assign different classes to the object. Therefore, it is necessary to address the ensemble of detection results from the first and second models to a combined output. The present disclosure achieves this utilising the described classification metric.

Figure 5:
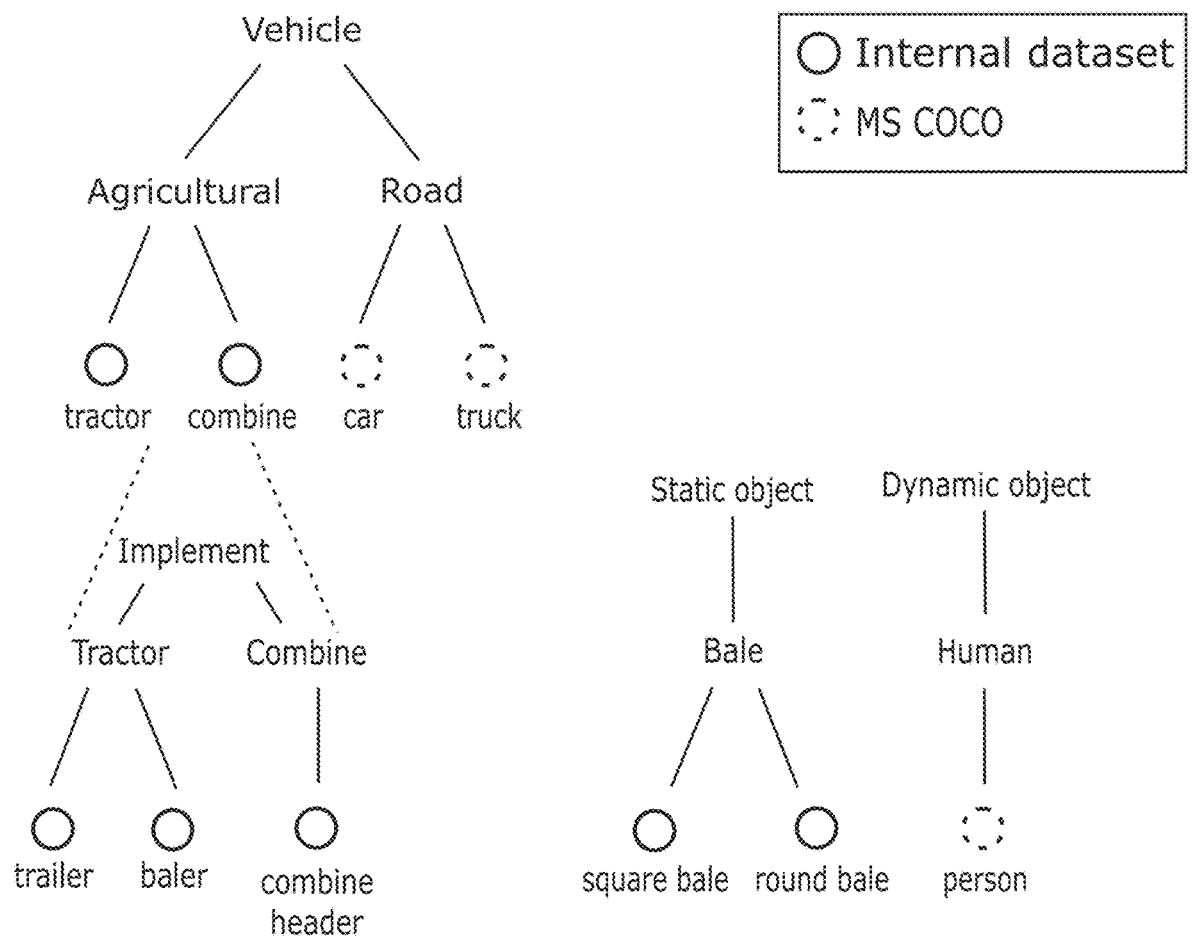
FIG. 5 is a diagram illustrating a hierarchical approach utilised in aspects of the present disclosure discussed herein.

For the better overview of linkage between different base classes and their corresponding subcategories and supercategories, the hierarchy of classes is shown in FIG. 5. While operating in the field, the agricultural machines often have an implement attached to them. In our test set, this is a very common case and in the hierarchy this dependence is shown as a link between the base classes 'tractor' and 'combine', and subcategories 'Tractor' and 'Combine' for the supercategory 'Implement'. In general sense, an agricultural vehicle with an implement is considered to be part of 'Agricultural vehicle' subcategory and the high level supercategory 'Vehicle'.

As discussed, the present invention utilises a classification metric in the step of determining an identity for an object. Here, this is demonstrated by removing detections from the second model in certain scenarios, specifically utilising a classification metric as a measure of an overlap between the classifications from the two models. In this experimental setup, 'Truck' detections are discounted based on an IoU value for the classifications from the first and second models in the following cases, for respective classifications from the first model:

agricultural vehicle paired with its implement: if IoU≥0.6
individual vehicle and implement detections:
  part of vehicles and implement pair: if IoU≥0.6
  not part of vehicle and implement pair: if IoU≥0.8

Similarly, 'Car' detections are discounted based on IoU value in the following cases:

individual vehicle and implement detections: if IoU≥0.8

3. Results and Discussion

This section analyses performance of the models in three cases. First, the performance of the individual models on the test dataset is evaluated. Then, the performance of both models combined with ensemble module is evaluated. Finally, the performance of the models at subcategory level is evaluated.

3.1. Performance Evaluation of Individual Models

First, the performance of the individual models on the test set is evaluated. As expected, the models are not able to detect the classes that they were not trained on. This results in mAP equal to zero for these classes affecting the average mAP on the test set. The results are shown in table 2, below.

| Class | Internal model | | COCO model | |
|---|---|---|---|---|
| | mAP@.5 | mAP@.5:.95 | mAP@.5 | mAP@.5:.95 |
| tractor | 0.731 | 0.536 | 0 | 0 |
| combine | 0.689 | 0.497 | 0 | 0 |
| trailer | 0.655 | 0.459 | 0 | 0 |
| combine_header | 0.672 | 0.399 | 0 | 0 |
| baler | 0.0788 | 0.0338 | 0 | 0 |
| square_bale | 0.858 | 0.571 | 0 | 0 |
| person | 0 | 0 | 0.649 | 0.39 |
| car | 0 | 0 | 0.778 | 0.59 |
| truck | 0 | 0 | 0.065 | 0.0308 |
| all | 0.409 | 0.277 | 0.166 | 0.112 |

The first detection model trained on the internal dataset has good mAP for all the classes it has been trained on, except 'baler'. However, because the model is not able to detect classes 'person', 'car' and 'truck', the average mAP@0.5 for all classes is 0.409 and mAP@0.5:0.95 is 0.277. The second model trained on the generic COCO dataset is able to detect classes 'person' and 'car' very well, while class 'truck' has low mAP. Similar to internal model, the mAP is affected by the classes the model cannot detect resulting in mAP@0.5 equal to 0.166 and mAP@0.5:0.95 equal to 0.112. It can be concluded from the presented results that the individual models, for themselves, are not performing well adequately on the targeted test set.

3.2 Performance with the Ensemble Module

The performance of combined models is evaluated with ensemble module and compared to performance without the ensemble module. The results are reported using multiclassification confusion matrix and mAP at IoU threshold equal to 0.5 and as well as averaged over 10 IoU thresholds [0.5:0.95]—FIGS. 6A and 6B.

First, the detections of the two models were concatenated into combined output without the ensemble module and the performance is evaluated. Compared to the performance of the individual models, the combined model is able to detect all classes in the test set. Therefore, the overall performance computed as mAP@0.5 increased from 0.49 and 0.166 to combined mAP@0.5 of 0.575—Table 3.

Then, the ensemble module is added and applied to combined output and the performance is evaluated with emphasis on misclassification of similar classes detected by the two models.

Figure 6A:
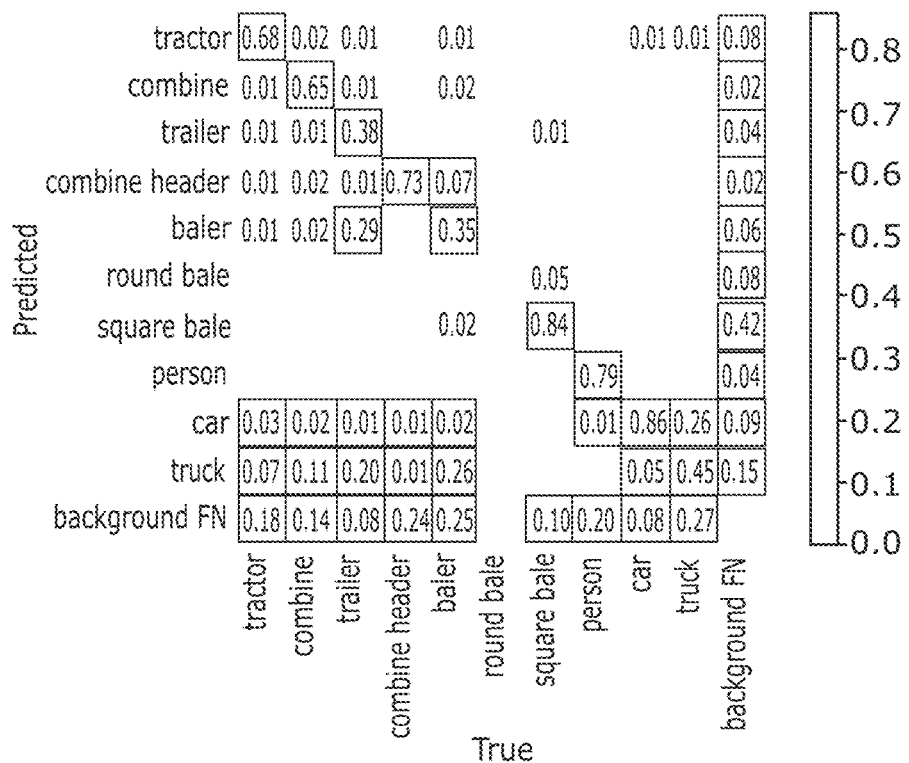
FIGS. 6A & 6B are confusion matrices illustrating the operational use of aspects of the present disclosure discussed herein.
Figure 6B:
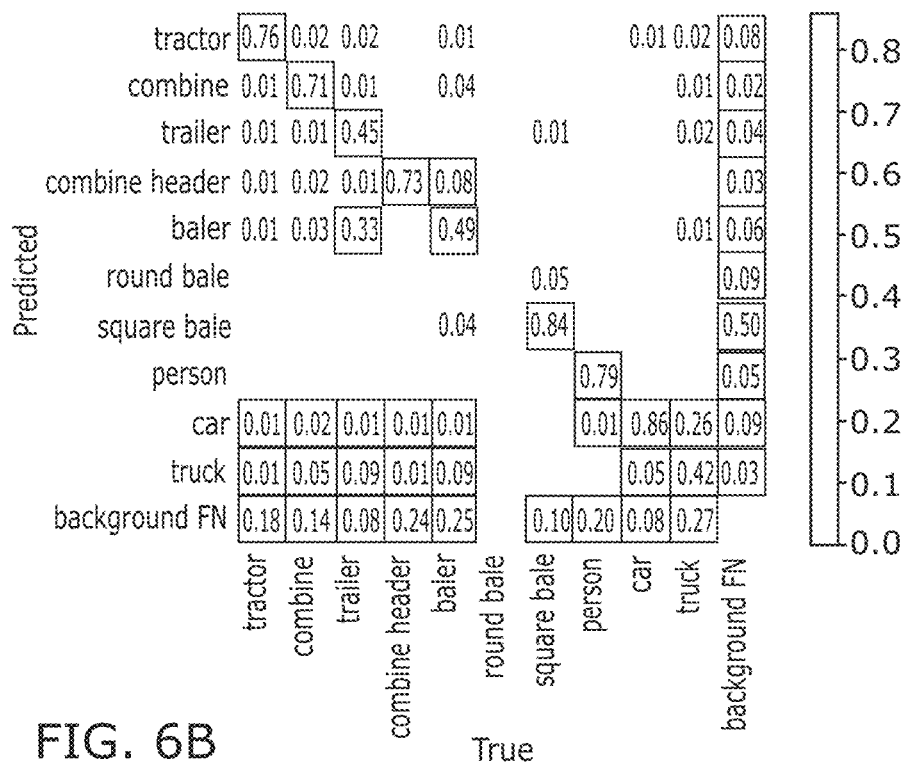

A confusion matrix comprehensively illustrates classification accuracy of object detector as well as misclassifiaction rate for pairs of classes. The confusion matrices for combined model without the ensemble module and with the ensemble module are shown in FIGS. 6A and 6B respectively. The rows in the matrix correspond to the instances predicted to belong to a class, and the columns correspond to the instances in the actual class. In the calculation of confusion matrix, only boxes with confidence score greater then 0.25 are considered. The threshold for IoU between ground-truth and detected bounding box is set to 0.45 and columns in the confusion matrices are normalized.

It can be seen that the ensemble module has significantly better performance, and the confusion between road vehicle classes and classes for agricultural vehicles and implements is lower. Initially the combined model the classes 'trailer' and 'baler' are most easily confused with class 'truck'. After applying the ensemble module the values of corresponding elements in the confusion matrix are lower and values in diagonal elements for classes 'trailer' and 'baler' improved. The similar can be observed for classes 'tractor' and 'combine', while values for 'combine header' remain the same.

When it comes to class 'car', there is a small decrease in noticeable in misclassifiaction of classes 'tractor' and 'baler'.

Looking at Table 3, below, it can be seen that the overall mAP@0.5 increased from 0.575 to 0.605 when ensemble module is applied. The same trend can be observed with mAP@0.5:0.95 which increased from 00.390 to 0.404. The increase is due to the increase in mAP for class 'truck'. This resulted from removal of misclassification of agricultural vehicles and implements as 'truck' as these are considered as false positives for this class.

TABLE 3

Comparison of combined detections of two models without ensemble module and with the ensemble module.

| Class | Without ensemble module | | With ensemble module | |
|---|---|---|---|---|
| | mAP@.5 | mAP@.5:.95 | mAP@.5 | mAP@.5:.95 |
| tractor | 0.731 | 0.536 | 0.731 | 0.536 |
| combine | 0.689 | 0.497 | 0.689 | 0.497 |
| trailer | 0.655 | 0.459 | 0.655 | 0.459 |
| combine_header | 0.673 | 0.399 | 0.672 | 0.399 |
| baler | 0.0787 | 0.0338 | 0.0787 | 0.0338 |
| square_bale | 0.858 | 0.571 | 0.858 | 0.571 |
| person | 0.649 | 0.39 | 0.649 | 0.39 |
| car | 0.777 | 0.59 | 0.725 | 0.549 |
| truck | 0.065 | 0.0308 | 0.386 | 0.201 |
| all | 0.575 | 0.39 | 0.605 | 0.404 |

Figure 7:
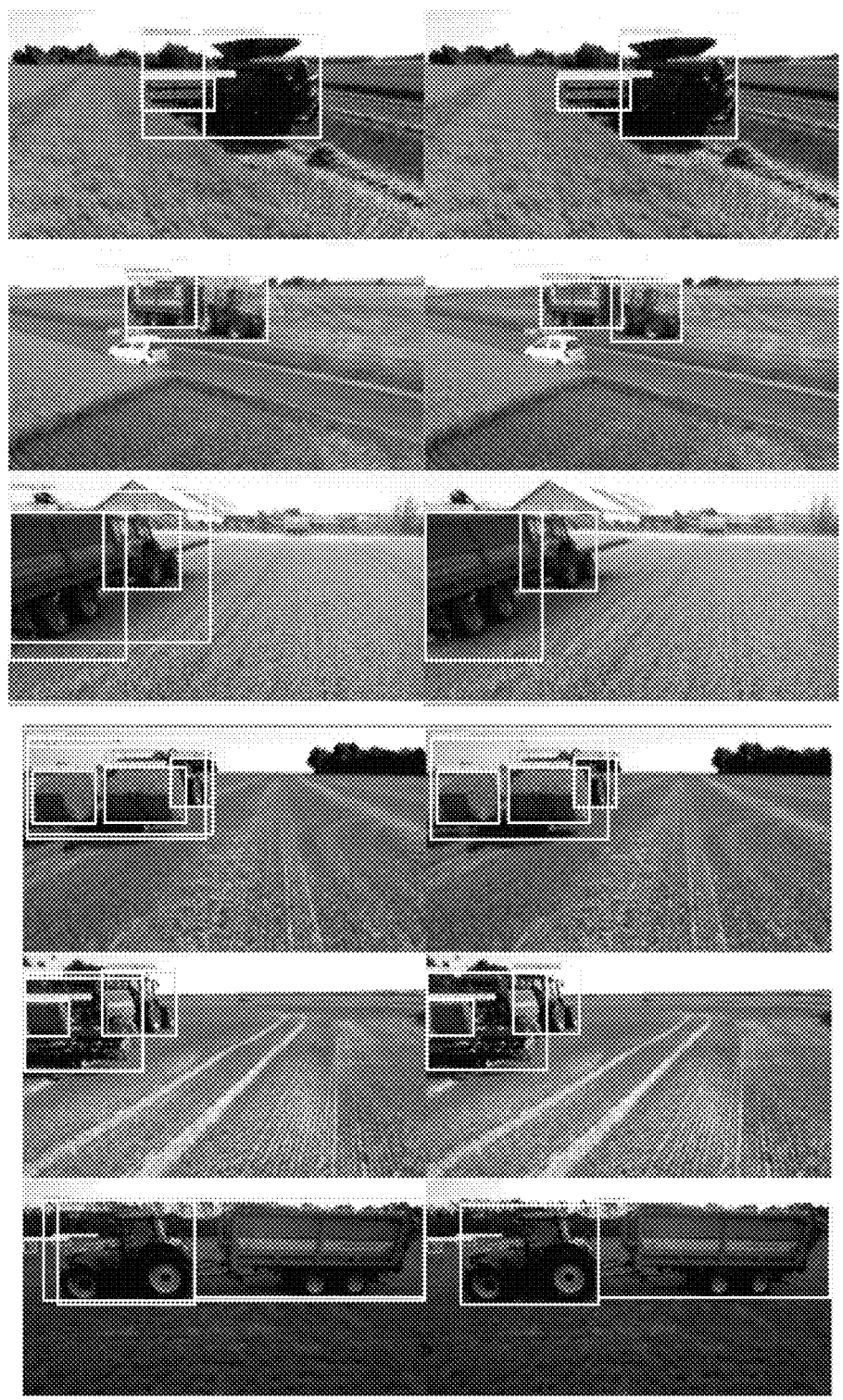
FIG. 7 illustrates the operational use of the present disclosure.

The qualitative performance of ensemble module is presented in FIG. 7. The first example shows 'truck' detection removed because internal model detected 'combine' and 'combine header' pair. The second example shows 'truck' detection removed because internal model detected 'tractor' and 'trailer' pair. The fourth example shows 'baler' attached to 'tractor' and two 'square bales'. The fifth example, shows again 'baler' attached to 'tractor' and one 'square bale'. In this case there are two redundant detection, one 'truck' detection corresponding to 'baler' and one 'car' detection corresponding to 'tractor'. The sixth example shows 'trailer' attached to 'tractor' and two redundant 'truck' detections. A first redundant detection corresponds to 'tractor' and 'trailer' pair and the other one to 'tractor' only.

General

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

All references cited herein are incorporated herein in their entireties. If there is a conflict between definitions herein and in an incorporated reference, the definition herein shall control.

What is claimed is:

1. A control system for an object detection system for an agricultural machine, the control system comprising one or more controllers, and being configured to:
   receive image data from one or more imaging sensors associated with the agricultural machine;
   analyze the image data utilizing first and second detection models to classify, for one or both models, an object within the environment of the agricultural machine;
   determine a classification metric for the object indicative of an overlap associated with the classification obtained for each of the models for the object; and
   determine an identity for the object in dependence on the classification metric and the classification obtained for the first and/or second models;
   wherein the control system is configured to:
   control operation of one or more operable components associated with the agricultural machine in dependence on the determined identity; and
   compare the classification metric with a threshold value.

2. The control system of claim 1, wherein the first and/or second detection models comprise machine-learned models trained on one or more training datasets with known objects with respective classifications.

3. The control system as claimed in claim 2, wherein the training datasets for first and second models are different.

4. The control system as claimed in claim 3, wherein the training dataset for the first model comprises an agricultural dataset; and the training dataset for the second model comprises a generic dataset.

5. The control system of claim 1, wherein classification by the first and/or second detection models comprises assignment of a class to the object from a plurality of classes associated with the model, and wherein the plurality of classes are be grouped by category, and optionally by subcategory.

6. The control system as claimed in claim 5, configured to determine the identity for the object in dependence on the class and/or category of the classification for the first and/or second model.

7. The control system of claim 1, wherein the classification output by the first and second models comprises a bounding box overlaid onto the image data at the location of the object as determined by the respective model; and the classification metric comprises a measure of an overlap of the bounding boxes determined for the first and second models.

8. The control system as claimed in claim 1, configured to determine the identity for the object in dependence on the classification for the first model only in dependence on the classification metric exceeding the threshold value.

9. The control system as claimed in claim 1, wherein the threshold value is variable, and is dependent on a context parameter.

10. The control system as claimed claim 1, wherein the threshold value is dependent on the classification assigned by the first model.

11. The control system of claim 1, wherein the one or more imaging sensors include a camera; and/or a LIDAR sensor.

12. The control system of claim 1, wherein the one or more operable components include a user interface; and the control system is operable to output, via the user interface, an indicator indicative of the determined identity to an operator of the agricultural machine.

13. The control system of claim 1, wherein the one or more operable components include a guidance system for the agricultural machine; and wherein the control system is configured to control operation of the guidance system for controlling operation thereof for controlling motion of the machine in dependence on the determined identity for the object.

14. The control system of claim 1, wherein the one or more operable components comprises a data server associated with the agricultural machine; and wherein the control system is operable to store on the data server information indicative of the determined identity for the object.

15. An object detection system for an agricultural machine, comprising one or more imaging sensors; and wherein the system further comprises and/or is controllable by the control system of claim 1.

16. An agricultural machine comprising the control system of claim 1.

17. A method of object detection, comprising:
receiving image data from one or more imaging sensors associated with an agricultural machine;
analyzing the image data utilizing first and second detection models to classify, for one or both models, an object within the environment of the agricultural machine;
determining a classification metric for the object indicative of an overlap associated with the classification obtained for each of the models for the object;
determining an identity for the object in dependence on the classification metric and the classification obtained for the first and/or second models;
controlling operation of one or more operable components associated with the agricultural machine in dependence on the determined identity; and
comparing the classification metric with a threshold value.

* * * * *